United States Patent
Vacca et al.

(10) Patent No.: US 10,954,387 B2
(45) Date of Patent: Mar. 23, 2021

(54) DISPENSABLE CHEMICAL COMPOSITION WITH HIGH AMOUNT OF FILLER MATERIALS AND LOW THIXOTROPIC INDEX LEVELS

(71) Applicant: SAES GETTERS S.p.A., Lainate (IT)

(72) Inventors: Paolo Vacca, Milan (IT); Gaetano Campanella, Giulianova (IT); Emiliano Bertinotti, Busto Arsizio (IT)

(73) Assignee: SAES GETTERS S.p.A., Lainate (IT)

( * ) Notice: Subject to any disclaimer, the term of this patent is extended or adjusted under 35 U.S.C. 154(b) by 0 days.

(21) Appl. No.: 16/468,384

(22) PCT Filed: Mar. 12, 2019

(86) PCT No.: PCT/IB2019/051977
§ 371 (c)(1),
(2) Date: Jun. 11, 2019

(87) PCT Pub. No.: WO2019/175755
PCT Pub. Date: Sep. 19, 2019

(65) Prior Publication Data
US 2020/0062961 A1    Feb. 27, 2020

(30) Foreign Application Priority Data

Mar. 14, 2018 (IT) .................. 102018000003535

(51) Int. Cl.
| | | |
|---|---|---|
| C08L 83/04 | (2006.01) | |
| C08K 3/04 | (2006.01) | |
| C08K 3/013 | (2018.01) | |
| C08K 3/22 | (2006.01) | |
| C08K 3/36 | (2006.01) | |
| C08K 5/09 | (2006.01) | |

(52) U.S. Cl.
CPC ............. *C08L 83/04* (2013.01); *C08K 3/013* (2018.01); *C08K 3/042* (2017.05); *C08K 3/22* (2013.01); *C08K 3/36* (2013.01); *C08K 5/09* (2013.01); *C08K 2003/2203* (2013.01); *C08K 2003/2206* (2013.01); *C08K 2201/005* (2013.01); *C08K 2201/016* (2013.01); *C08L 2203/20* (2013.01); *C08L 2205/025* (2013.01)

(58) Field of Classification Search
CPC combination set(s) only.
See application file for complete search history.

(56) References Cited

U.S. PATENT DOCUMENTS

| | | | |
|---|---|---|---|
| 5,922,470 A | 7/1999 | Bracken et al. | |
| 6,623,864 B1* | 9/2003 | Sweet | B32B 7/12 |
| | | | 428/447 |
| 2005/0048296 A1* | 3/2005 | Meguriya | B32B 15/06 |
| | | | 428/447 |
| 2005/0256259 A1* | 11/2005 | Goto | C08L 83/04 |
| | | | 524/588 |
| 2007/0026244 A1* | 2/2007 | Budden | C08L 83/04 |
| | | | 428/447 |
| 2007/0117920 A1 | 5/2007 | Hirabayashi et al. | |
| 2007/0135555 A1* | 6/2007 | Hirabayashi | C08L 2666/54 |
| | | | 524/492 |
| 2011/0315923 A1 | 12/2011 | Vacca et al. | |
| 2015/0355581 A1* | 12/2015 | Matsunaka | C09J 183/04 |
| | | | 399/333 |
| 2016/0017185 A1 | 1/2016 | Albaugh et al. | |
| 2018/0323124 A1* | 11/2018 | Yamaguchi | C08L 83/04 |

FOREIGN PATENT DOCUMENTS

| | | |
|---|---|---|
| EP | 1 788 031 A1 | 5/2007 |
| WO | WO 2011/117094 A1 | 9/2011 |
| WO | WO 2014/143627 A1 | 9/2014 |

OTHER PUBLICATIONS

International Search Report and Written Opinion dated May 9, 2019 in PCT/IB2019/051977 filed Mar. 12, 2019.

* cited by examiner

*Primary Examiner* — Marc S Zimmer
(74) *Attorney, Agent, or Firm* — Oblon, McClelland, Maier & Neustadt, L.L.P.

(57) ABSTRACT

A dispensable chemical composition comprising a blend of siloxane polymeric components, with a low viscosity component in an amount greater than a high viscosity component, and suitable to integrate a high amount of filler materials while maintaining rheological features of thixotropic index and viscosity values at low and high shear rates proper for a dispensing paste.

9 Claims, No Drawings

DISPENSABLE CHEMICAL COMPOSITION WITH HIGH AMOUNT OF FILLER MATERIALS AND LOW THIXOTROPIC INDEX LEVELS

The present invention relates to a dispensable chemical composition comprising a blend of siloxane polymeric components and suitable to integrate high amount of filler materials (while maintaining low thixotropic index levels).

Considering the advantageous rheological and dispensability property, the dispensable composition of the present invention can be usefully employed in manufacturing electronic or opto-electronic devices.

A good composition dispensability and usefulness in manufacturing processes are strictly connected to its rheological features, in particular to its viscosity and thixotropic behavior, a property which can be easily described by the thixotropic index (TI). The thixotropic index is a measure of the shear-dependent properties and can be defined as the ratio of viscosities measured at a certain lower rpm (or low shear rate) to viscosities measured at a certain higher rpm (or high shear rate).

For products suitable for some dispensing technologies, thixotropic index is usually obtained considering viscosities recorded at shear rates of 5 $s^{-1}$ and 50 $s^{-1}$. Specifically, considering our application for dispensing a composition paste, good dispensability properties are achieved with TI values lower than 3, generally comprised between 2 and 3 (i.e. typical TI for gel state) and simultaneously higher viscosity values (comprised between 50000-120000 mPa) measured at low shear rate and lower viscosity values (comprised between 20000-50000 mPa) measured at high shear rate.

Moreover, the integration of filler materials into an organic matrix is strictly related to the rheological and mechanical properties thereof and in particular, due to the rheological characteristics of typical siloxane-based formulations, it is commonly known that, in order to achieve good dispensability characteristics, the filler content should not be higher than 50% wt.

Generally, it is usually expected by the experts in the field that the rheology of the polymeric material will worsen if the content of filler particles increases.

In a first not limiting example, the present invention can be employed to obtain a composite sorber material to be used in a moisture-sensitive device in order to control the water level, both as a barrier positioned adjacent to the device perimeter by preventing moisture from entering electronic devices, and as a getter to absorb water amount at their inside.

In a broad meaning, with the term moisture-sensitive device there is intended any sealed device which requires moisture levels in the range of about 0.1 to 5000 parts per million (ppm) of water vapor, because their performance is affected by moisture. Examples of these devices are micro-electromechanical devices (MEMs) and micro-opto-electro-mechanical devices (MOEMs), opto-electronic devices for telecommunication applications, medical implantable devices (pace-makers, defibrillators), organic electronic devices such as OLEDs, OLETs and organic solar cells (OPV).

The typical approach for the preservation of these devices is to perform the encapsulation process by using suitable sealants, to reduce moisture transmission from the external environment, and to insert a desiccant composition inside the enclosure containing the moisture-sensitive device.

However, as a consequence of the hygroscopic nature of the typical materials employed (i.e. metal oxide powders), one of the main drawbacks is represented by a strong aggregation tendency, even in the presence of low moisture amounts or other particular conditions related to manufacturing processes involving composite material in which they are dispersed.

One possibility to solve the problem is to employ the same amount of filler while executing a surface modification of the particles. For instance, EP 2751029, in the applicant's name, discloses a desiccant composition suitable to be manipulated and used in manufacturing processes for moisture-sensitive devices, effectively reducing the aggregation phenomenon of the inorganic oxide particles dispersed therein, through the functionalization of the external surface by fatty acid anions. However, such a method does not allow to achieve suitable compositions when the filler amount exceeds a concentration of 50% by weight.

Another possible approach, described for instance in U.S. Pat. No. 9,447,308, involves the addition of a "mechanical thixotropic filler" in order to modulate the thixotropic index without increasing the volume resistivity of the curable silicone composition.

However, in both cited cases, the addition of a further compositional element or a manufacturing step is required, which means an increase in term of costs and time of the process.

In EP 2550692, in the applicant's name, a siloxane composition is described to be used for the protection of moisture-sensitive devices. However, in that case, the disclosure is silent about a rheological optimization of the thixotropic index if a mixture of two siloxane components is employed in relation to an effective selection of their components based on the respective molecular weights. As a consequence, the amount of filler employed, in this case calcium oxide, could not be higher than 50% by weight.

Inventors have found a strong impact of each polymeric component molecular weight on the dispensability of a composition and on the possibility to increase the filler amount, and they have been able to identify an ideal molecular weight distribution in order to design a proper combination of organic matrix and filler content.

In particular, the present invention discloses a blend composition of at least two siloxane components, characterized by two different molecular weights in the ranges between 35000 and 70000 g/mol for a first component and between 10000 and 30000 g/mol for a second component, in a ratio of the first to the second component comprised between 0.1 and 0.45 which can be formulated with at least one filler in an amount higher than 50%, up to 70%, by weight with respect to the total weight of the composition, resulting in suitable rheological values for a dispensing paste. The final composition obtained is therefore characterized by thixotropic index values comprised between 2 and 3, and concurrently viscosity values comprised between 50000 and 120000 mPa at a shear rate of 5 $s^{-1}$ and between 20000 and 50000 mPa at a shear rate of 50 $s^{-1}$.

In a preferred embodiment, the final composition is characterized by a ratio of the two siloxane components comprised between 0.15 and 0.45 and suitable rheological values for a dispensing paste consisting of thixotropic index values comprised between 2 and 3, and concurrently viscosity values comprised between 60000 and 120000 mPa at a shear rate of 5 $s^{-1}$ and between 30000 and 50000 mPa at a shear rate of 50 $s^{-1}$.

In a preferred embodiment, the blend consists of two siloxane components and its average molecular weight is comprised between 20000 and 40000 g/mol.

The composition, object of the present invention, comprises a blend of at least two siloxane polymeric components selected among siloxane polymers, siloxane copolymers, dimethylsiloxane polymers, vinylmethylsiloxane polymers, phenylsiloxane polymers, diethylsiloxane-dimethylsiloxane copolymers, vinylmethylsiloxane-dimethylsiloxane copolymers, -trimethylsiloxane and -vinyl terminated polydimethylsiloxane, -dimethylvinyl terminated dimethylsiloxane polymers.

The first siloxane polymeric component is characterized by a molecular weight comprised between 35000 and 70000 g/mol, and it can be selected among dimethylsiloxane polymers and -trimethylsiloxy terminated dimethylsiloxane polymers, phenylsiloxane polymers, diethylsiloxane-dimethylsiloxane copolymers, vinylmethylsiloxane-dimethylsiloxane copolymers, -vinyl terminated polydimethylsiloxane and -vinyl terminated diphenylsiloxane-dimethylsiloxane copolymers, -dimethylvinyl terminated dimethylsiloxane polymers.

Whereas the second siloxane component with a molecular weight comprised between 10000 and 30000 g/mol, can be selected in a group consisting of dimethylsiloxane polymers, vinylmethylsiloxane-dimethylsiloxane copolymers, diethylsiloxane-dimethylsiloxane copolymers with diethylsiloxane unit content lower than 25%, vinylmethylsiloxane-dimethylsiloxane copolymers with vinylmethylsiloxane unit content lower than 25%, -trimethylsiloxane and -vinyl terminated dimethylsiloxane polymers, -vinyl terminated diphenylsiloxane-dimethylsiloxane copolymers, -trimethylsiloxy terminated vinylmethylsiloxane polymers, -vinylphenylmethyl terminated vinylphenylsiloxane-phenylmethylsiloxane copolymer, -vinyl terminated diethylsiloxane-dimethylsiloxane copolymers, -silanol terminated vinylmethylsiloxane-dimethylsiloxane copolymers.

The present composition is then completed with at least one first filler material in an amount comprised between 50 and 70% by weight, preferably between 55 and 65%, and selected in a group consisting of alkaline earth metal oxides, lithium oxide, aluminosilicates, zeolites, metal organic framework MOF, adsorbing polymers and organic acid.

Moreover, said first filler material can be characterized by a shape factor, defined as the ratio between length and thickness of the particles, comprised between 1 and 5, and when they are used as powders, the maximum of the granulometric distribution is generally comprised between 0.1 and 20 μm.

A second filler, selected in a group consisting of fumed silica, silica, graphene and graphene oxide, CNT, phyllosilicate, nanocrystalline cellulose, polymer fibers and particles, can be optionally added in an amount lower than 10% by weight.

Hereinafter, the invention will be explained in more detail with reference to the following examples.

EXAMPLES

Different samples are prepared mixing together single or blended dimethylsiloxane polymers with calcium oxide or LTA zeolites as first filler and graphene oxide as second filler.

Sample compositions 1 to 4 are in accordance with the present invention and compared to sample 5, characterized by a different ratio between the two siloxane matrices, and sample 7 which was prepared according to EP 2550692.

Viscosities for each sample have been measured for the blend of the polymeric components in the selected ratio at a shear rate of 5 $s^{-1}$ and compared to the final compositions containing the fillers. Viscosity (cP) at different shear rates (s−1) has been measured by means of a rotational rheometer in flow curve test mode, with 20 mm cone/plate geometry and 0,052 mm gap.

Test temperature is preserved by a Peltier cell and a thermostatic bath. Obtained values are the result of averaging over three analyses performed on fresh material amounts.

Thixotropic indexes of both the blends and the compositions have been calculated as the ratio of viscosities measured at a shear rate of 5 $s^{-1}$ (low shear rate) to viscosity measured at a shear rate of 50 $s^{-1}$ (high shear rate).

| | Sample 1 | Sample 2 | Sample 3 | Sample 4 | Sample 5 - comparative | Sample 6 - comparative | Sample 7 - comparative |
|---|---|---|---|---|---|---|---|
| $1^{st}$ siloxane matrix | -dimethylvinyl terminated dimethylsiloxane polymer | | | | | | |
| $1^{st}$ siloxane MW [g/mol] | 40000 | | | | | | |
| $2^{nd}$ siloxane matrix | -vinyl terminated dimethylsiloxane polymer | | | | | | — |
| $2^{nd}$ siloxane MW [g/mol] | 27000 | | | | | | — |
| Ratio $1^{st}$ matrix/$2^{nd}$ matrix | 0.21 | 0.33 | 0.21 | 0.43 | 0.67 | 0.50 | — |
| $1^{st}$ filler | CaO | CaO | CaO | CaO | CaO | CaO | CaO |
| $1^{st}$ filler content | 60% | 60% | 60% | 60% | 60% | 60% | 60% |
| $2^{nd}$ filler | no | no | 1% graphene oxide | no | no | no | no |
| Viscosity at 5 $s^{-1}$ [mPa] (blend matrix) | 900 | 1100 | 900 | 1200 | 1400 | 1300 | 8600 |
| Thixotropic index (blend matrix) | 1.1 | 1.2 | 1.1 | 1.2 | 1.3 | 1.2 | 2.2 |
| MW [g/mol] (blend matrix) | 29000 | 31500 | 29000 | 32500 | 34000 | 33000 | 40000 |
| Viscosity at 5 $s^{-1}$ [mPa] (composition) | 70000 | 85000 | 113133 | 105000 | 131000 | 122500 | 930000 |
| Viscosity at 50 $s^{-1}$ [mPa] (composition) | 35000 | 40476 | 45253 | 50000 | 54100 | 51000 | 232500 |

-continued

|  | Sample 1 | Sample 2 | Sample 3 | Sample 4 | Sample 5 - comparative | Sample 6 - comparative | Sample 7 - comparative |
|---|---|---|---|---|---|---|---|
| Thixotropic index (composition) | 2 | 2.1 | 2.5 | 2.1 | 2.4 | 2.4 | 4.0 |

The comparative examples 5 and 6 point out that, although the final molecular weight of the blend is similar to the values according to our invention (i.e. examples 2 and 4), a different ratio between the two siloxane matrices (higher than 0.45) brings to viscosity values not suitable for a dispensing paste.

Moreover, sample 7 characterized by a single siloxane matrix according to EP 2550692, shows to have unsuitable rheological values, with both viscosities and thixotropic index values of the final composition outside from the typical range of a dispensing paste.

The invention claimed is:

1. A dispensable chemical composition comprising
a blend of at least two siloxane components comprising a first siloxane component selected among siloxane having a molecular weight comprised between 35000 and 70000, and a second siloxane component selected among siloxane having a weight-average molecular weight comprised between 10000 and 30000; and
at least a first filler material,
wherein a weight ratio between said first siloxane component and said second siloxane component is comprised between 0.1 and 0.45 and said filler is present in an amount between 50 and 70% by weight with respect to a total weight of the composition,
wherein the first siloxane component is selected from the group consisting of a dimethylsiloxane polymer, a diethylsiloxane-dimethylsiloxane copolymer, a vinyl-methylsiloxane-dimethylsiloxane copolymer wherein the vinyl group is in a terminal position, a vinyl-terminated polydimethylsiloxane polymer, and wherein the second siloxane component is selected from the group consisting of a dimethylsiloxane polymer, a diethylsiloxane-dimethylsiloxane copolymer with diethylsiloxane unit content lower than 25%, and a vinyl-terminated diethylsiloxane-dimethylsiloxane copolymer.

2. The composition according to claim 1, wherein the first filler material is selected from the group consisting of alkaline earth metal oxides, lithium oxide, aluminosilicates, zeolites, metal organic framework, and organic acid.

3. The composition according to claim 1, wherein the weight ratio between the first siloxane component and the second siloxane component is comprised between 0.15 and 0.45.

4. The composition according to claim 1, wherein the blend has an average weight-average molecular weight comprised between 20000 and 40000 g/mol.

5. The composition according to claim 1, wherein the amount of the first filler is comprised between 55 and 65%.

6. The composition according to claim 1, wherein the first filler material has a shape factor, defined as the ratio between length and thickness, comprised between 1 and 5.

7. The composition according to claim 1, wherein the first filler material consists of powders and wherein a maximum of granulometric distribution is between 0.1 and 20 μm.

8. The composition according to claim 1, wherein a second filler is added in an amount between 0 and 10% by weight, with respect to the total weight of the composition.

9. The composition according to claim 8, wherein the second filler material is selected from the group consisting of fumed silica, silica, graphene, graphene oxide, CNT, phyllosilicate, nanocrystalline cellulose, polymer fibers, and polymer particles.

* * * * *